(12) United States Patent
Nowlin et al.

(10) Patent No.: US 6,308,113 B1
(45) Date of Patent: Oct. 23, 2001

(54) ASSEMBLY FOR MOVING A ROBOTIC DEVICE ALONG SELECTED AXES

(75) Inventors: Brentley Craig Nowlin, Homerville; Lisa Danielle Koch, Cleveland, both of OH (US)

(73) Assignee: The United States of America as represented by the United States National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 09/606,103

(22) Filed: Jun. 9, 2000

(51) Int. Cl.$^7$ ............................... G06F 19/00; G06F 3/00
(52) U.S. Cl. ................................ 700/245; 345/961
(58) Field of Search .................................. 700/245, 249, 700/257, 261, 264, 83, 84, 86, 87, 88, 89; 345/961, 700, 762, 763, 810, 819–820, 825, 828–829

(56) References Cited

U.S. PATENT DOCUMENTS

| | | |
|---|---|---|
| 3,890,552 | 6/1975 | Devel . |
| 4,901,218 * | 2/1990 | Cornwell ................................. 700/2 |
| 5,224,032 | 6/1993 | Worn . |
| 5,611,948 * | 3/1997 | Hawkins ........................... 219/121.63 |
| 5,737,218 * | 4/1998 | Demotte et al. ........................ 700/86 |
| 5,784,542 | 7/1998 | Ohm . |
| 5,949,683 * | 9/1999 | Akami et al. ........................ 700/123 |

\* cited by examiner

Primary Examiner—William A. Cuchlinski, Jr.
Assistant Examiner—Thu Nguyen
(74) Attorney, Agent, or Firm—Kent N. Stone

(57) ABSTRACT

An assembly for moving a robotic device along selected axes includes a programmable logic controller (PLC) for controlling movement of the device along selected axes to effect movement of the device to a selected disposition. The PLC includes a plurality of single axis motion control modules, and a central processing unit (CPU) in communication with the motion control modules. A human-machine interface is provided for operator selection of configurations of device movements and is in communication with the CPU. A motor drive is in communication with each of the motion control modules and is operable to effect movement of the device along the selected axes to obtain movement of the device to the selected disposition.

7 Claims, 5 Drawing Sheets

ASSEMBLY FOR MOVING A ROBOTIC DEVICE ALONG SELECTED AXES

ORIGIN OF THE INVENTION

The invention described herein was made by employees of the United States Government and may be manufactured and used by or for the Government of the United States of America for Governmental purposes without the payment of any royalties thereon or therefor.

BACKGROUND OF THE INVENTION

1. Field of the Invention

This invention relates to the positioning of robotic arm members and other devices, for measuring and monitoring selected parameters of forces acting on the arm members or devices, and is directed more particularly to an assembly which effects movement of such members and/or devices in accordance with preestablished computer programs and in accordance with real-time inputs by a human operator.

2. Description of the Prior Art

Movable measurement probes are widely used in research facilities to measure parameters such as pressure, temperature, and flow angle of a moving liquid or gas. Extensive data is gathered from readings taken from the measurement probes. By moving a probe, a large area of a flow stream can be surveyed and monitored without introducing a large bulky measurement probe or a large number of small individual probes, either of which can itself affect the flow parameters, and therefore the measurements.

Motion control systems currently in use typically are cumbersome, difficult to use, slow to take data, difficult to set up and troubleshoot, and quite expensive. Validation of numerical tools used for the design and analysis of turbomachinery requires increasingly more detailed surveys of flowpaths. The demand for such data has dictated additional requirements for probe activation systems found in testing facilities.

In U.S. Pat. No. 3,890,552 (hereinafter "'552"), issued Jun. 17, 1975, in the names of George C. Devol et al, there is disclosed a computer programmed controller for controlling two axes of motion, or two robotic arms. In the '552 controller, first and second manipulators cooperate with each other in executing a series of operations, including motions in a substantially mirror-image mode. Each manipulator has a main operating structure that carries a work head through several degrees of freedom in space, and the work head itself is capable of various secondary movements. The two manipulators are capable of operating under separate controls for executing related but independent operations. Separate manual controls are used for the two manipulators which can be provided with memory capabilities; the manipulators can also operate automatically under the separate control of their respective memories. The two manipulators are operable in a cooperative, complementary mode, with the same commands being used directly or indirectly to control both manipulators. In the case of indirect control of the second manipulator, control commands are used to control operation of the first manipulator, and control input for effecting corresponding, cooperative operation of the second manipulator is derived from the operations of the first manipulator, the two manipulators operating in a corresponding manner and maintaining their work heads in alignment with each other. In the case of direct control, the second manipulator responds to the same control commands as those supplied to the first manipulator, the two manipulators executing the same motions or mirror-image motions as required, adjustment being introduced for maintaining alignment and control of the work heads.

Thus, in '552 a controller controls a primary manipulator, and a secondary manipulator follows the primary. Alternatively, the secondary manipulator is provided with an independent motion capability. Both manipulators operate according to a set of pre-defined motion commands, and both continuously monitor and adjust positions of the manipulators.

It appears that the '552 system is not field-programmable, inasmuch as most controls are hardware-based. It further appears that changes to profiles, or parameters, of manipulator movement are entered into the system by punch cards or text file (data set), and could not easily be changed. The '552 patent does not appear to teach or suggest a system which permits changing a motion profile in real time. In short, '552 does not provide an easy to use, field-programmable motion system.

In U.S. Pat. No. 5,224,032 (hereinafter "'032"), issued Jun. 29, 1993, in the names of Heinz Worn et al, there is disclosed a process and system for controlling movements of robotic arms on a program-controlled machine. The system includes a position control unit, a velocity control unit, and a power control unit. Loads acting on an arm during operation of the machine are measured by sensors. Load signals are fed back regeneratively in the sense of an increase in the position control variance, to a summation point of the position and/or velocity control unit. To increase or decrease mechanical flexibility of the arm, a controllable amplifying or attenuating device is provided. The sensors are types selected in accordance with the loads to be measured and preferably are directly associated with axes of the arm.

Thus, in the '032 patent there is provided means for controlling an arm on a program-controlled machine, with the help of sensors. The '032 system incorporates mechanical flexibility into the arm movements, which flexibility can be advantageous in view of obstacles otherwise in the motion path, or load changes. Again, it does not appear that the '032 system is easily re-programmed or changed in real time.

In U.S. Pat. No. 5,784,542 (hereinafter "'542"), issued Jul. 21, 1998, in the names of Timothy Ohm et al, there is disclosed a teleoperated robot system for use in microsurgery. The system includes a low friction, low inertia, six-axis force feedback input device comprising an arm with double-jointed, tendon-driven revolute joints, a decoupled tendon-drive wrist, and a base with encoders and motors. The input device functions as a master robot manipulator of a microsurgical teleoperated robot system including a slave robot manipulator coupled to an amplifier chassis which is coupled to a workstation with a graphical user interface. The amplifier chassis is further coupled to the motors of the master robot manipulator, and the control chassis is coupled to the encoders of the master robot manipulator. A force feedback is applied to the input device and is generated from the slave robot to enable a user to operate the master robot via the input device without physically viewing the slave robot. Alternatively, the force feedback can be generated from the workstation to represent fictitious forces to constrain the input device control of the slave robot to be within predetermined boundaries.

Thus, the '542 patent presents a robot system in which a user operates a master robot via an input device, such as a graphical user interface, without actually viewing the slave robot. The slave robot is controlled by the motion of a master robot. It appears that the '542 system lacks the ability to move arms according to a set of motion commands that can be changed in real time.

Accordingly, while the prior art noted above has provided significant and substantial steps forward in the state of the art, there remains a need for an assembly for moving a robotic device along selected axes, which assembly is versatile, user-friendly, and subject to field re-programming and to changes by a user in device movement parameters in real time, by use of a point-and click user interface. Furthermore, the prior art does not fulfill the need for a control system that is able to move axes along pre-programmed paths or motion profiles, autonomously in automatic nulling mode, and/or interactively.

SUMMARY OF THE INVENTION

An object of the invention is, therefore, to provide an assembly for moving a robotic device along selected directions of movement, or axes, for selected distances, the assembly being subject to easy re-programming in the field, and to user changes in device motion profiles in real-time, by use of a point-and-click user interface.

In accordance with another object of the invention, the assembly is adapted to control motions along eighteen or more axes of a device or devices, either independently or simultaneously, and either manually or automatically.

In accordance with a further object of the invention, the assembly is adapted to properly position robotic devices constituting nulling pressure probes, for use in fluid flow parameter measurement. These types of probes, among others, provide the capability to measure pressure, temperature, and flow angle of a fluid moving through a flow conduit.

With the above and other objects in view, as will hereinafter appear, a feature of the present invention is the provision of an assembly for moving a robotic device along selected axes. The assembly includes a programmable logic controller (PLC) for controlling movement of the device along selected axes to effect movement of the device to a selected disposition. The PLC comprises a plurality of single axis motion control modules and a central processing unit (CPU) in communication with the motion control modules. The assembly further includes a human-machine interface (HMI) for operator selection of configurations of device movements and in communication with the CPU, and a motor drive in communication with each of the motion control modules and operable to effect movement of the device along the selected axes to obtain the selected disposition of the device.

In accordance with further features of the invention, the assembly is provided with facility for easy re-programming in the field in real-time, by a point-and-click user interface on the HMI.

In accordance with a still further feature of the invention, the assembly is provided with means for controlling motions along eighteen or more axes, selectively independently or simultaneously, and manually or automatically.

In accordance with a still further feature of the invention, the assembly's robotic devices constitute probes for use in measuring fluid flow parameters, and the probes may include nulling pressure probes.

The above and other features of the invention, including various novel details of construction and combinations of parts, will now be more particularly described with reference to the accompanying drawings and pointed out in the claims.

It will be understood that the particular assembly embodying the invention is shown by way of illustration only and not as a limitation of the invention. The principles and features of this invention may be employed in various and numerous embodiments without departing from the scope of the invention.

BRIEF DESCRIPTION OF THE DRAWINGS

Reference is made to the accompanying drawings in which is shown an illustrative embodiment of the invention, from which its novel features and advantages will be apparent.

In the drawings.

DESCRIPTION OF THE PREFERRED EMBODIMENT

Figure 1:
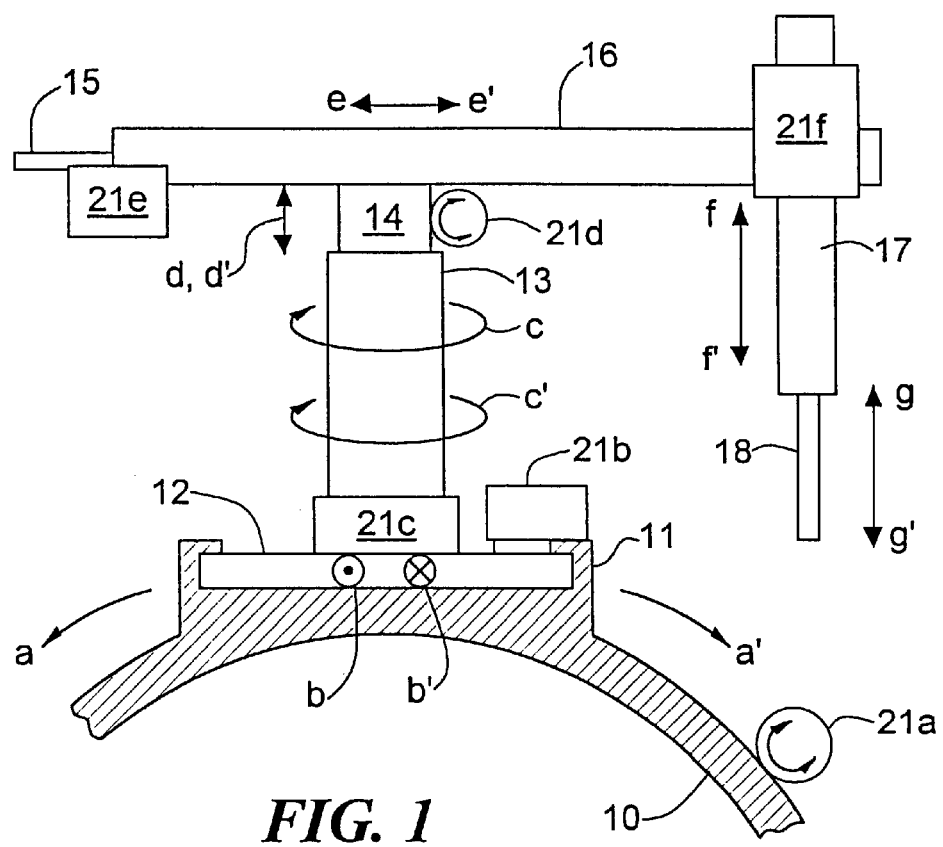
FIG. 1 is a diagrammatic illustration of a robotic pressure probe having freedom of movement along several axes, and adapted for use in conjunction with the invention described herein.

Referring to FIG. 1, it will be seen that an illustrative robotic assembly having a plurality of axes of freedom includes a curved base portion 10 movable in a circular manner in direction a,a'. The curved base portion 10 may be provided with an elongated planar portion 11 in which is slidably disposed a plate 12 for sliding movement in the planar portion 11 in directions b,b'. Rotatably upstanding from plate 12 is tube 13 movable in directions c,c' about a central axis thereof. Telescopically mounted in the tube 13 is a post 14 movable axially in the tube 13 in directions d,d'. Mounted on the post 14 is a cross-bar 15 and mounted thereon is a sleeve 16 movable in directions e,e' along the cross-bar 15. Fixed on the sleeve 16 is a tubular member 17 movable in directions f,f', and within the tubular member 17 is a probe 18 movable in the tubular member 17 in directions g,g'.

An actuator 21a is adapted to move the curved base portion 10 in directions a,a'. An actuator 21b is adapted to move the plate 12 along the planar portion 11 in directions b,b'. An actuator 21c is adapted to move the tube 13 rotatively around its axis in directions c,c'. An actuator 21d is adapted to move post 14 axially in the tube 13 in directions d,d'. An actuator 21e is adapted to move the sleeve 16 along the cross-bar 15 in directions e,e'; and an actuator 21f is adapted to move the tubular member 17 in directions f,f' and the probe 18 therein in directions g,g'.

Thus, the probe 18 is movable through axes a–a', b–b', c–c', d–d', e–e', f–f', and g–g'. The probe 18 may be a pressure probe for monitoring fluid flow, or, alternatively, any robotic device requiring movement through one or more axes. It will be apparent that the assembly shown in FIG. 1 is for illustrative purposes only. Any number of axes may be provided for a particular robotic device.

In the inventive assembly described hereinbelow, eighteen axes may be controlled simultaneously, if desired. The eighteen axes may reside in a single robotic device, or one axis may reside in each of eighteen different robotic devices. However, inasmuch as a large number of devices may well defeat the purpose of the invention, it is contemplated that as a practical matter the invention will find utility in conjunction with one or a few multi-axes devices, the one or more devices having in total up to eighteen axes.

Figure 2:
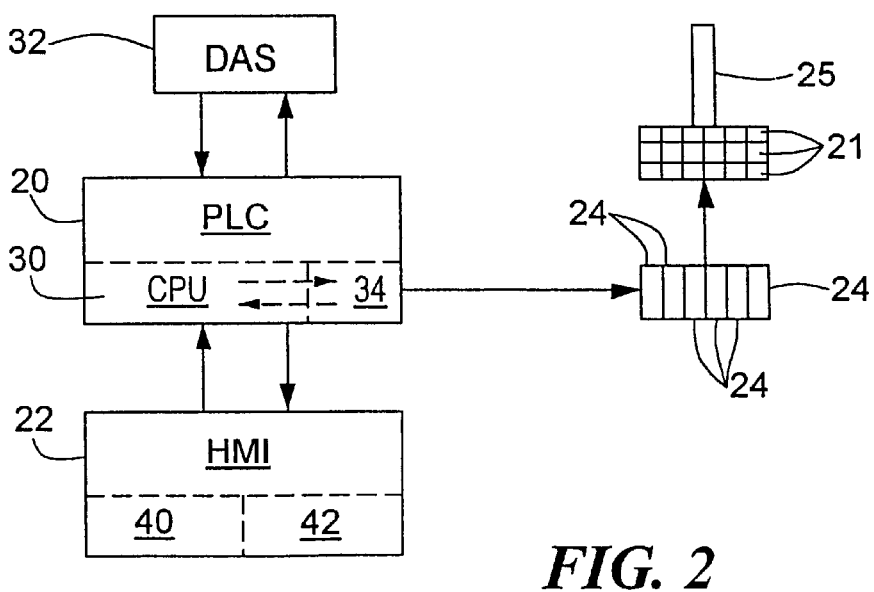
FIG. 2 is a block diagram of one form of assembly for moving a robotic device of the type shown in FIG. 1, and illustrative of an embodiment of the invention.

Referring to FIG. 2, it will be seen that an illustrative embodiment of the assembly includes three main components, a programmable logic controller (PLC) 20, a human-machine interface (HMI) 22, and motor drives 24. The assembly controls the speed and direction of movement along specified axes of probes, arms, movable stator vanes, laser tables, and/or virtually any device driven by a motor and drive that accepts a +/−10 volts DC signal (hereinafter "devices" 25). The PLC 20, HMI 22, and motor drives 24 operate together to accomplish the control of the various axes of motion through actuators 21.

The PLC 20 comprises a Modicon Quantum PLC, and the HMI 22 comprises WonderWare Intouch software running on a personal computer. The Modicon Quantum PLC preferably is a Modicon Quantum 424 (140 CPU 42400, or better) processor and a Quantum QMOT module (140 MSB 101 00) per motion axis to be controlled. The HMI WonderWare Intouch software comprises Intouch v 5.6b, or above. Microsoft Excel 4.0, or above, is used for motion profile operation. The system computer running the Intouch software should be at least a Pentium personal computer. The link between the PLC 20 and the HMI 22 can be performed through Modbus or Modbus Plus protocol. The motor drive assembly 24 comprises DC brushless servo motors and their respective drives. The motor drive assembly 24 may, alternatively, be any device or combination of devices that accept a +/−10 volts direct current signal.

The assembly may include a data acquisition system (DAS) 32, which is an Escort D data and control system in one embodiment of the invention. The DAS in the first embodiment is easily adapted to other DAS.

PLC Overview

The PLC 20 uses a single axis motion control module 34 to control the position and movement of the device 25 along a single axis. Commands are downloaded into a PLC central processing unit (CPU) 30, processed, and sent to the appropriate motion control module 34. The motion control modules 34 are intelligent modules that communicate to the CPU 30 through a PLC backplane. Each motion control module 34 uses six 16-bit words to send commands from the CPU 30 to the module, and six 16-bit words to send data from the module 34 to the CPU 30. The six words that send commands to the module 34 comprise a module status word, a command word, and four command data words. The six words that send data back to the CPU 30 are an axis status word, a command echo word, and four receive data words.

The typical operation of sending a command includes loading any required data into the four command data words, and loading the command's opcode in the command word. Then, the CPU 30 must wait for the contents of the command echo word to be the same as the command opcode. Thereafter, the CPU saves any necessary returned information and proceeds to the next command opcode. A module status register in the CPU is used to keep track of which opcode is currently being sent to the motion control module 34, and hence which operation the robotic device is currently performing. Under normal operation, the command cycle that the CPU 30 executes is to obtain the current axis position from the motion control module 34, to obtain the status of the module digital inputs (for home switch and limit switch status), and to perform a user-defined operation, then repeat these three commands. If a parameter is changed by an operator, the CPU 30 interrupts this continuous cycle, performs the operation, and then resumes the cycle.

Data registers to and from the motion control modules 34 are used to send or receive desired information to or from the motion control modules. For parameters such as position moves, speeds, in position bands, and other floating point numbers, the four data words are used to represent the floating point number as follows: the first data word and the second data word represent the portion of the data to the left of the decimal point; the third and fourth data words are used to represent the data to the right of the decimal point. The HMI 22 and the CPU 30 convert parameters for all axes into this four word format for the motion control modules 34, transparent to the user.

Using this four-word format, the range of numbers that the motion control modules are able to operate with is from −79999999.99999999 to +79999999.99999999. The range also is limited by two other parameters that are dependent upon an axis positioning encoder. The low end of the range corresponds to the distance represented by one count of the positioning encoder. The high end of the range corresponds to ($2^{31}$/position encoder counts per base unit), or (2147483648/position encoder counts per base unit).

HMI Overview

The software of the HMI 22 consists of two menus that are used to configure and run the robotic device movements along the selected axes. A main menu 40 is used to set the system name, axis names and parameters, and system parameter file name. A run menu 42 is used to actually command the device to perform selected motion, set axis parameters, and execute motion profiles.

The Main Menu

Figure 3:
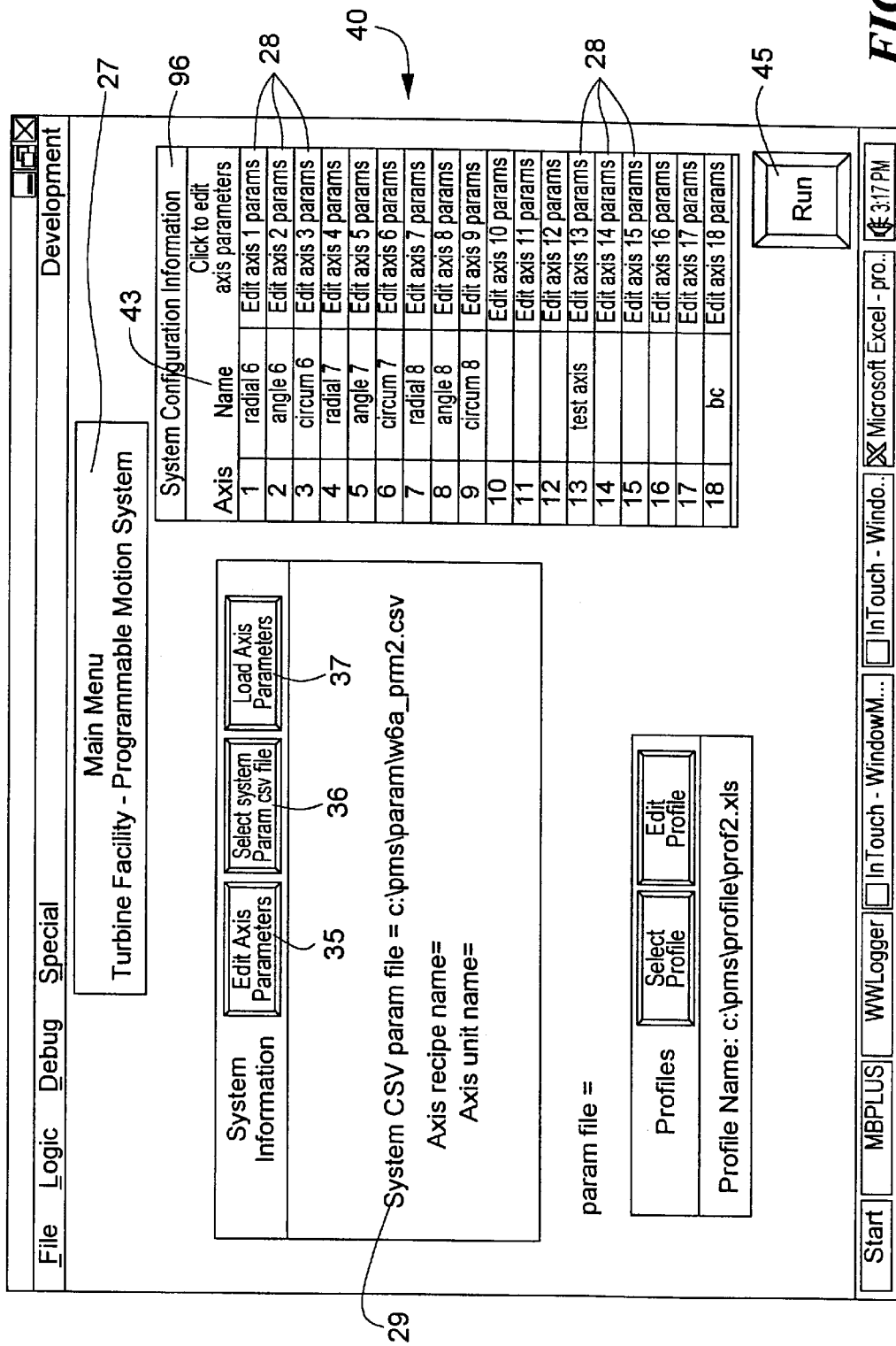
FIG. 3 is a front elevational view of a display of a "main menu" portion of the human-machine interface of the assembly.
Figure 4:
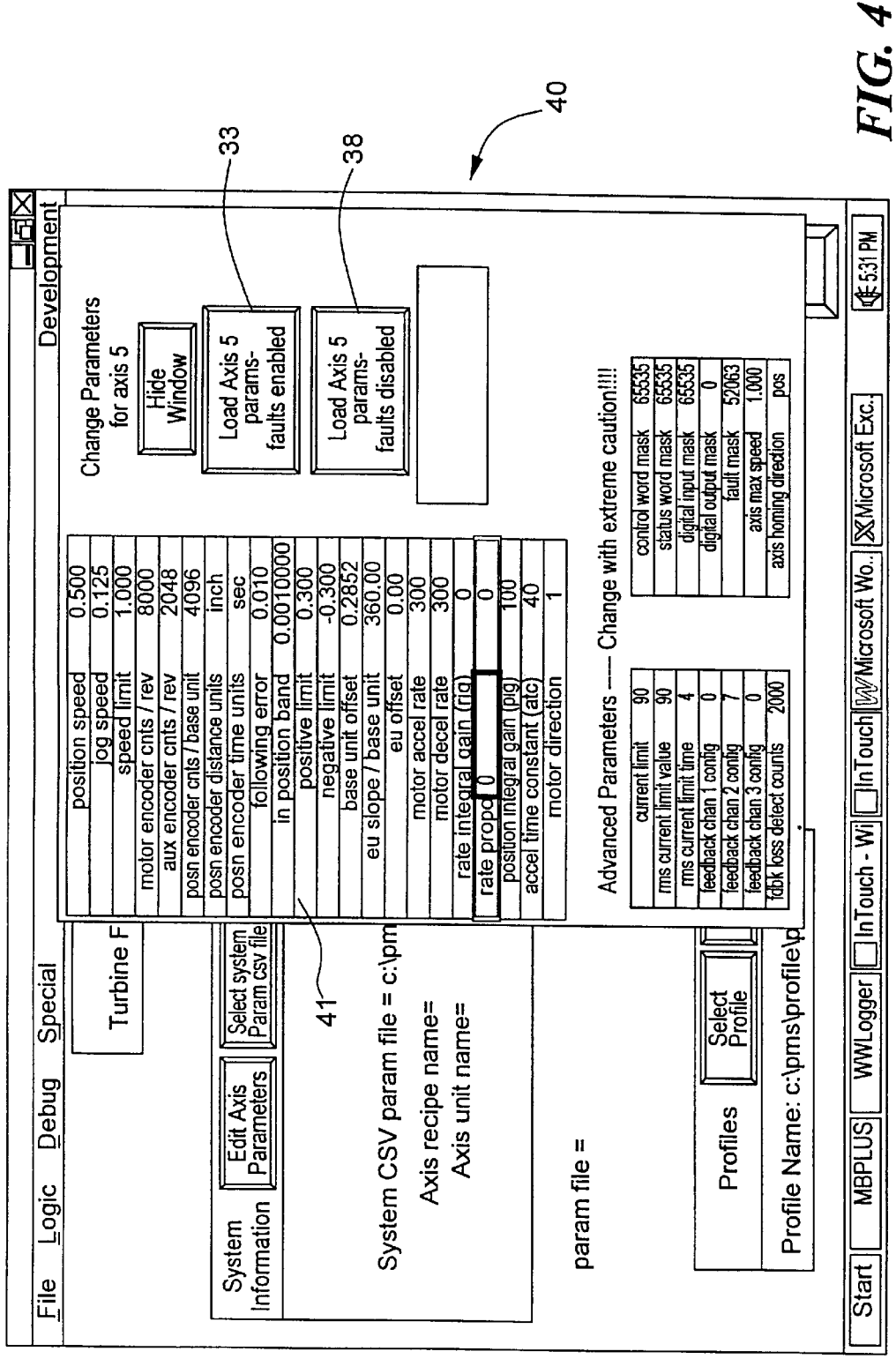
FIG. 4 is similar to FIG. 3, but shows the display portion effecting a different presentation.

An illustrative front elevational view of the main menu 40 is shown in FIGS. 3 and 4. The user is able to change axis parameters, using main menu buttons 35, 36, 37, while the axis is running and executing motion, and can also download entire sets of axis parameters, either for a selected axis or for the motion system as a whole. The system parameters for each axis are saved in a single specified system parameter file in comma separated value (CSV) format, and can be viewed, printed, or edited from Microsoft Excel. If the parameters for a specific axis are changed, the changes also are written to the specified system parameter file. Multiple system parameter files may be defined, and the system allows the user to select a desired system parameter file with the button 36 (FIG. 3), edit it, and download it to the PLC CPU 30 and motion control modules 34.

The system also allows the user to edit parameters on a specific axis of motion. Clicking on the specific axis's parameter edit button 28 causes the system to read the parameters for the axis from the PLC CPU 30, display them, and allow the user to edit them. The parameters are displayed in window 41 (FIG. 4) and edited in base unit format, which is further described hereinbelow. The parameters can be downloaded with the fault bit either enabled (FIG. 4, button 33) or disabled (button 38). Under normal circumstances, the user should download the parameters with the fault bit disabled. If an axis is generating a fault due to the downloaded parameters, it is sometimes useful to download the parameters with the fault bit enabled. This will cause the axis to freeze the status register when the parameter that is causing the fault is being downloaded to the motion control module 34. The parameters that are read from the PLC 20 are read from the CPU 30, not the motion control module 34 for the specified axis. The motion control modules 34 do not retain their settings on power loss, so the system must download the parameters if any or all modules have power cycled to them. An illustrative front elevational view of the main menu 40, with axis 5 open for parameter editing, is shown in FIG. 4.

Other parameters that may be set are the system application's title 27, the system parameter CSV file name 29, and the name 43 (FIG. 3) for each axis. These parameters, as well as all axis parameters mentioned above, can be edited from the main menu 40. Intouch saves the title, system parameter CSV file name, and axis names. The axis parameters are saved by the PLC 20 in battery backed RAM. In addition to editing these parameters from the main menu 40, axis positioning and jog speeds, commanded position, incremental move amount, following error, in-position band, and nulling deadband can be set from the run menu 42, discussed hereinbelow.

The Run Menu

Figure 5:
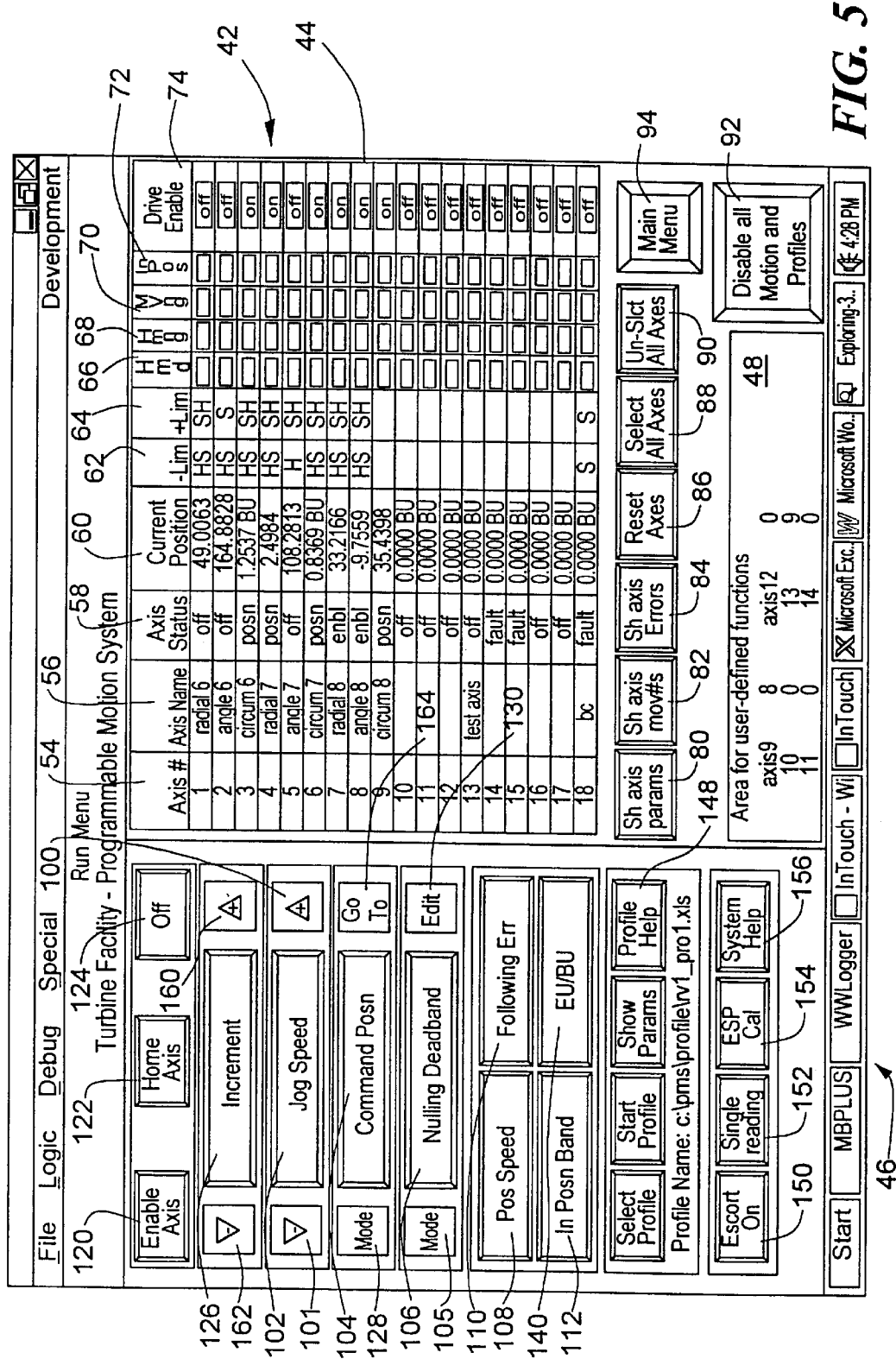
FIG. 5 is a front elevational view of a display of a "run menu" portion of the human-machine interface of the assembly.
Figure 6:
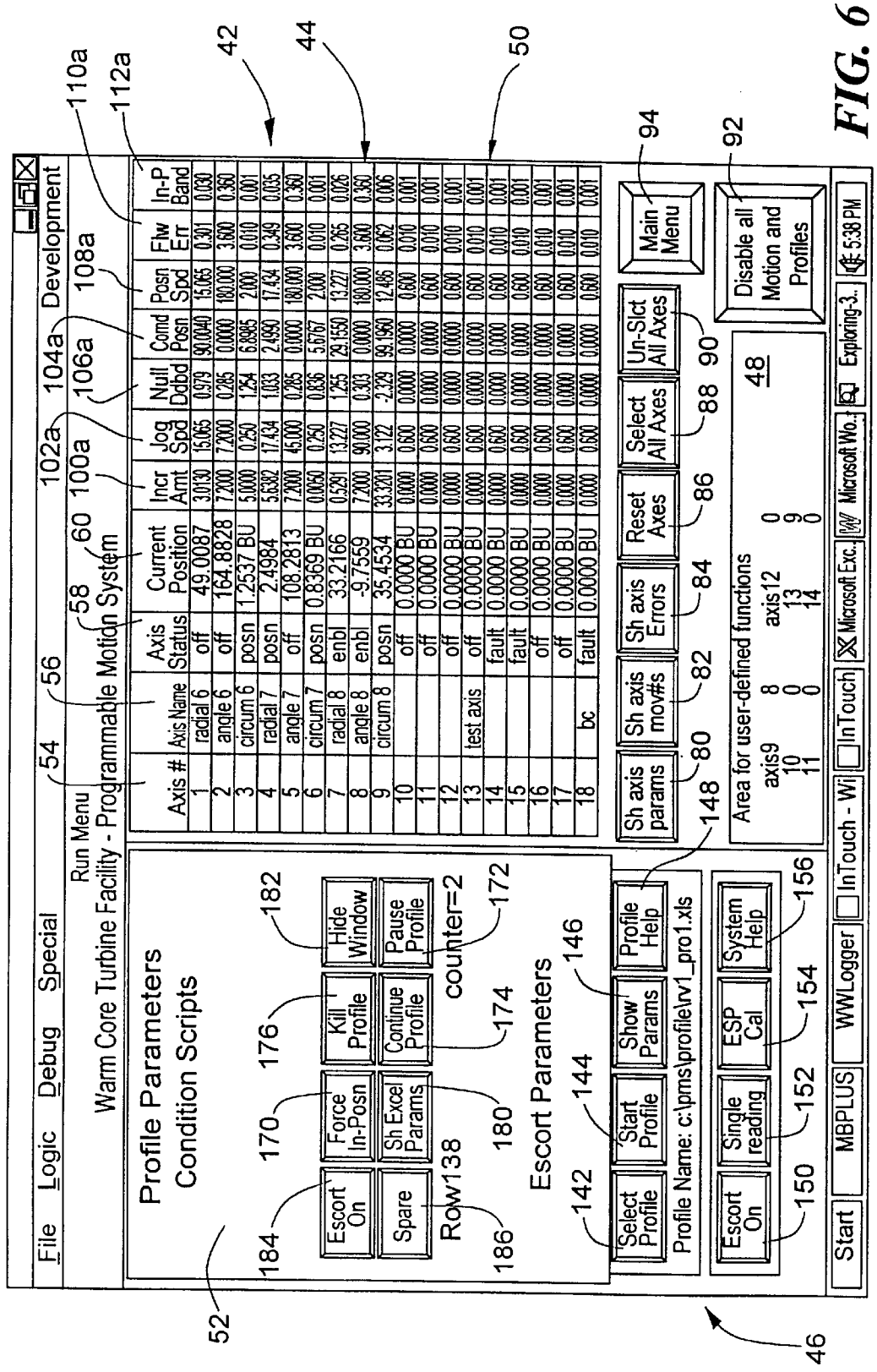
FIG. 6 is similar to FIG. 5, but shows the display portion effecting a different presentation.

Controlling the movement of the arm along selected axes is performed from the run menu 42, which is entered from the main menu 40, by run button 45 (FIG. 3). The run menu 42 includes an axis table 44, an axis control panel 46, and an area 48 for user defined functions. Illustrative front elevational views of the run menu are shown in FIGS. 5 and 6. The run menu 42, along with axis parameters windows 50 and the profile parameters windows 52, are shown in FIG. 6. The axis parameter window 50 and the profile parameter window 52 will be discussed hereinbelow.

The user can input axis parameters in either base units (easily measured and generally invariant from one application to another, such as revolutions or inches) or engineering units (units dependent upon a particular test, such as % span). The conversion from base units (BU) to engineering units (EU) is simply a linear slope and offset conversion. Nonlinear conversions may be easily programmed. If axis 1, shown in axis number column 54 in FIGS. 5 and 6, is in base units and axis 2 is in engineering units, the value entered for any parameter will be in base units for axis 1, and engineering units for axis 2. Generally, for most cases, after the axes have been set up, the axes should be left in engineering units mode for most operations.

Axis motion follows a similar operation as setting axis parameters. All motion commands are performed on selected axes only. The standard motions are jog positive or negative, incremental move positive or negative, move to commanded position, and home axes. Motion along any axis need not be complete before another move command is entered for any axis, including the axis currently in motion. This feature is due to the fact that motion commands are downloaded to the axis motion control modules 34 almost instantaneously, and the PLC CPU 30 can then download additional motion commands (or any other command, such as change of a parameter) subsequently.

To allow communications with the DAS 32, the motion system is designed to set values in a PLC communications register set aside for DAS operations. Another PLC register is reserved for reading back acknowledgments from the DAS 32. If the motion system fails to receive the correct acknowledgment, an error window is opened and the appropriate error is displayed. The user can then take action to rectify the situation causing the error.

If the user desires, additional features may be programmed. The run menu window is set up such that adequate room is left near the bottom of the menu to program any desired features or functions. Buttons, Intouch variable values, and PLC register values are some examples of items that may be programmed. The motion system lends itself well to user programming of the system itself.

Axis Table

The axis table 44 lists, for each axis, the axis number 54, axis name 56, axis status 58, axis current position 60 (in base units or engineering units), negative and positive limit switch status 62, 64 (FIG. 5), "homed since last enable" indication 66, homing indication 68, moving indication 70, in-position bit indication 72, and drive enable indication 74. Axes are selected by clicking on the desired axis names 56. Any or all axes may be selected at any time. If an axis is selected, the box that the axis name appears in is yellow, otherwise the box is gray. All axis operations are performed on the selected axes only; the other axes are left unchanged.

There are several buttons associated with the axis table 44: show/hide axis parameters 80 (FIGS. 5 and 6), show/hide axis move parameters 82, show/hide axis errors 84, reset axes 86, select all axes 88, un-select all axes 90, disable all motion and profiles 92, and main menu 94. A brief description of each button is given below.

Show/Hide Axis Parameters: The toggle button 80 on the axis table 44 activates windows (FIG. 6) showing incremental amount 100a, jog speed 102a, nulling deadband 106a, command position 104a, positioning speed 108a, following error 110a, and in-position band 112a. The parameters shown are displayed either in base units (BU) or engineering units (EU) depending on the selected units for each axis.

Show/Hide Axis Move Parameters: The toggle button 82 displays or hides the incremental move amount 100a or commanded position 104a for each axis. The parameters shown are displayed either in base units (BU) or engineering units (EU) depending on the selected units for each axis.

Show/Hide Axis Errors: The Show/Hide Axis Errors button 84 is used to display an error window (not shown) containing information related to all axes. If an axis encounters an unmasked error of any kind, the axis drive is disabled. The motion system also saves the first error code, the maskable error register, and the non-maskable error register. The motion system saves the first error code because that error is usually the cause of the axis error; subsequent errors are ignored. The button 84 displays a window (not shown) containing information regarding the error code, maskable error register, and the maskable error register contents of each axis. The error code and contents of the error registers provides information that is valuable in diagnosing problems with an axis.

Reset All Axes: The button 86 resets the faults of all axes, as well as the axis module status register to 0, which causes the axis to resume the continuous loop of obtaining axis position, obtaining axis discrete inputs (limit/home switches), and performing a user defined operation. Resetting axes does not change the mode of any axis, only the fault registers and the module status registers. This is useful if the module status register is stuck on a particular value, and is helpful in debugging new software/hardware.

Select All Axes: The button 88 selects all axes that have been named on a System Configuration Information display 96 on the main menu 40 (FIG. 3).

Un-Select All Axes: The Un-select All Axes button 90 (FIG. 5) un-selects all axes, regardless of whether any individual axis (or axes) has been selected.

Disable all Motion and Profiles: The button 92 disables all axes immediately and stops the profile execution. All robotic device motion is immediately stopped.

Main Menu: The button 94 sends the user back to the main menu 40. It does not affect any motion or profile currently underway.

Axis Control Panel

As noted above, the run menu 42 provides the user with the ability to change the robotic arm positioning and jog speed, commanded position, incremental move amount, following error, in-position band, and nulling deadband for any or all axes. Toggling selected axes from one units mode to the other is also accomplished from the run menu, as well as other functions that will be described herein below.

Enable Axis: If an axis is enabled without any motion command having been issued since it was last enabled, the axis is considered simply enabled, shown by the "enbl" symbol in the Axis Status space 58 (axis 7, axis 8) on the axis table 44 (FIGS. 5 and 6). Selected axes must be enabled by actuation of an Enable Axis button 120 (FIG. 5) before any motion is executed.

Home Axis: Homing an axis by actuation of a Home Axis button 122 (FIG. 5) commands the axis to enter its homing routine and the word "home" will appear in the Axis Status space 58 on the axis table 44 (none shown in FIGS. 5 and 6). Once the axis has completed its homing operation, it is returned to the mode it was in prior to the home command being issued. During the homing routine, the axis will start moving at the selected positioning speed in the specified homing direction (set in the axis parameters from the main menu). Once the axis senses the home switch, it keeps moving until it senses the next positioning encoder marker pulse.

Off: If an Off button 124 (FIG. 5) is clicked, the selected axes will have their motor drives 24 disabled and the symbol "off" will appear in the Axis Status space 58 on the axis table 44 (see axes 1, 2, 5, 10–13, 16, and 17 in FIGS. 5 and 6).

Increment: The user can move the selected axes incrementally, in the positive or negative direction, at the selected positioning speed, by clicking either the up or down arrow buttons 160, 162 next to an Increment button 126. Moving an axis incrementally puts the axis in either increment positive (symbol "incr+") or increment negative ("incr–") mode, which is displayed in the Axis Status space 58 on the axis table 44 (none shown in FIGS. 5 and 6). The amount of the incremental move is entered by clicking the Increment button 126, and is entered in either engineering units or base units, depending on the axis mode selected. As noted previously, the axis need not complete its current motion before another motion command is issued to any axis, including the selected axes.

Jog: Jog positive or negative simply jogs the device along selected axes, at their selected jog speed, in the proper direction. If an axis is jogging, it is considered in either jog positive (symbol "jog+") or jog negative (symbol "jog–") mode, and once jog motion has completed (button released), the axis is returned to the mode it was in prior to the jog button being clicked. The motion is entered by clicking an up arrow button 100 or a down arrow button 101 next to a Jog Speed button 102. As long as the button 102 is clicked, the selected axes will move in the specified direction at the specified jog speed. When the button is released, the selected axes will decelerate to a stop. The jog command cancels any other current motion commands in progress for the specified axes, but doesn't change the axis mode.

The jog speed is entered by clicking on the Jog Speed button 102. Jog speed for selected axes is entered on the axis control panel 46 (FIG. 5). The jog speed is entered in either engineering units or base units, depending on the axis units selected.

Command Positioning: Command positioning mode allows a device to move at the selected positioning speed, to a commanded absolute position, regardless of the current device position. An axis must be placed in position mode by clicking on a Mode button 128 to the left of a Command Position button 104. Once in position mode, "posn" will appear in the Axis Status space 58 on the axis table 44 (FIGS. 5 and 6, axes 3, 4, 6 and 9). Commanded positions are entered on the axis control panel 46. The commanded positions are entered in either engineering units or base units, depending on the axis units selected. As mentioned previously, the device need not complete its current motion before another motion command is issued to any axis, including the selected axes. If a new commanded position move is issued before the device has reached the current command position, the device simply immediately starts moving toward the new commanded position; the old command position is overiden.

Nulling Deadband: Null mode allows the yaw (rotation) axis to follow a signal that is external to the axis motion control module 34, usually a pressure transducer signal measuring the pressure differential across a yaw probe. An axis is considered to be in null mode if a Mode button 105 (FIG. 5) next to the Nulling Deadband button 106 is pressed. While in null mode, the word "null" will appear in the Axis Status space 58 on the axis table 44 (none shown in FIGS. 5 and 6). The axis motion is controlled by a proportional/integral/derivative (PID) control loop which operates around the positioning loop for the axis. The PID loop takes the actual differential pressure transducer signal (converted to engineering units of pressure) and calculates a desired position based on the PID loop setpoint. The system solves the PID algorithm every 250 milliseconds, and, after each PID solution interval, enters a new commanded position for the axis. The actual axis position is still read from the positioning encoder. The PID loop uses the positive and negative software limits entered by the user (set in the axis parameters from the main menu 40) as its highest and lowest output values. The nulling algorithm is true PID.

The system allows the user to edit the nulling parameters for any axis by clicking on an Edit button 130 next to the Nulling Deadband button 106. The system allows the user to enter a non-zero setpoint for the PID loop, which allows the user to compensate for transducer zero offsets. The system also allows the user to set the PID parameters of proportional gain, integral time constant, and derivative time constant. Setting the nulling direction allows the user to change the PID loop action, which eliminates the need to change the pressure tubing between the yaw probe and the pressure transducer. In addition to the PID parameters, the system also allows the user to change the nulling deadband. Nulling deadband is the amount that the pressure differential can be from zero and still be considered to be in position. The in-position bit for the axis is set from the nulling deadband, not the usual in-position bit from the motion control module. The pressure differential across the probe, pressure differential deviation from the setpoint, software limits, and axis position are also displayed on the Nulling Deadband edit window 106*a* (FIG. 6).

Positioning Speed: The user can change the positioning speed along selected axes by clicking on the Position Speed button 108 (FIG. 5). The new speed is entered on the direct data entry keypad in either engineering units or base units, depending on the axis units selected. The positioning speed for any axis may be changed at any time. If the positioning speed entered is too large for an axis, an error window (not shown) appears, and the old setting for positioning speed is retained.

Following Error: Following error is defined as the difference between the axis actual position and the expected axis position based on axis positioning speed. Following error is useful if a binding problem is suspected. The user can change the allowable following error for selected axes by clicking on the Following Error button 110. The new following error is entered on the axis control panel 46 in either engineering units or base units, depending on the axis units selected. The following error for any axis may be changed at any time. In the default fault mask configuration, the following error fault is disabled (masked out).

In-position Band: When the actual position for an axis falls inside a range around the commanded position, the axis is considered to be inside the in-position band. If the position of an axis is inside the in-position band, the in-position bit is set for that axis. The in-position bit is used especially for profile operations. The user can change the in-position band for selected axes by clicking on the In Posn Band button 112. The new in-position band is entered on the direct data entry axis control panel 46 in either engineering units or base units, depending on the axis mode selected. The in-position band for any axis may be changed at any time.

Engineering Units/Base Units: As noted above, parameters for selected axes may be entered in either base units or engineering units, depending on the units mode for the selected axes. The units are changed for selected axes by clicking on an EU/BU toggle button 140. If an axis was previously in EU mode, it is changed to BU mode, and vice versa. All parameters entered are considered to be in the units format of the selected axes.

Select Profile: A Select Profile button 142 (FIGS. 5 and 6) is used to select the current profile to either edit or execute. The names of the profiles are stored at default location c:\pms\profiles. A file select window (not shown) opens and displays the current profiles in that directory, and the user is able to click on any one of those profiles, or profiles located in other directories. Once selected, the system will open that file in Microsoft Excel. The user is able to edit the file in Excel.

Start Profile: A Start Profile button 144 is used to initiate the execution of a motion profile. If Excel is not running the current selected profile, the system will open the file in Excel, set the necessary Dynamic Data Exchange (DDE) communications parameters, and begin execution of the profile. The DDE comprises a Microsoft Windows protocol for sharing data between Windows applications. The system opens the profile parameters window 52 (FIG. 6). The window 52 displays all information regarding the profile's execution. The motion system initializes the profile parameters and reads the contents of the data entered in the first row of the Excel file.

Show Params: A Show Parameters button 146 is used to open the profile parameters window 52 at any time.

Profile Help: A Profile Help button 148 opens a series of windows designed to guide the user through the steps of writing and executing a profile.

DAS: an Escort on button 150 is used to toggle the motion system between attempting to communicate with Escort (assuming the DAS 32 to be an Escort system), and simulating communications with Escort. In Escort off, the motion system simply substitutes a time delay for all commands sent to the DAS 32. This allows profiles that use data system commands to be executed without the data system, which facilitates troubleshooting.

Single Reading: A Single reading button 152 initiates a single data recording from the motion system. The motion system sets the communications register in the PLC 20 to a value, which is read by the DAS 32 (hereinafter "Escort"). If the PLC does not receive the acknowledgment after 3 seconds, the motion system assumes there is a problem, and the HMI PC displays an error message. Typical sources of these errors are Escort 32 not scanning, or improper cabling between Escort and the PLC 20. If the Escort on button 150 is set to off, the motion system simulates sending the single record command to Escort.

ESP Cal: Electronically scanned pressure (ESP) systems are are used in an embodiment to measure large numbers of research pressures. The ESP system needs to be calibrated periodically. An "ESP Cal" button 154 commands the Escort system to initiate calibration of the ESP system. If the parameter Escort on button 152 is set to off, the ESP Cal button simply simulates the command to Escort. Again, if the motion system does not receive the acknowledgment in 3 seconds, the motion system signals an error.

System Help: A System Help button 156 opens a series of windows (not shown) that are used for displaying general system help screens on the HMI. Buttons for the next or previous help page allow the user to access all of the help screens. The help screens can be opened or closed at any time without affecting axis movement. The help windows can be altered, and additional help windows can be created, to suit individual needs.

Motion Profiles

Motion profiles are written in Microsoft Excel, and follow a specified format to allow the motion system to interpret the contents of the profile correctly. In the profile file, the first column, column A, is used to hold the desired command for the motion system to execute. The operands for the command are contained in the second through the nineteenth columns, or columns B through S. Most profile commands only use the command column, column A, and the second column, column B. The motion system steps through the motion profile, one row at a time. The motion system starts profile execution by reading the contents of row 1, determines the command in row 1, column A, then executes the command entered in row 1, column A. The motion system then steps to row 2 and repeats this process. All data entered in the motion profile is considered case-insensitive, and therefore, can be entered in either uppercase or lowercase.

Profile Execution

Profile execution is based on two types of condition scripts, programmed in Intouch. The first type is a set of scripts that is required for normal profile operation, regardless of the user's desired functions. These scripts include setting the Excel DDE parameters (set_dde_app_topic), initialization of the profile parameters (initialize_profile), reading the next line (next_line), determining the command on the current line (run_profile), and profile termination (end_profile). All other profile scripts serve to carry out a specific user command.

After reading the contents of a particular row, the motion system runs an Intouch script, run_profile, to determine the desired operation for that row, based on the contents of the first column. If the cell in the first column of the desired row contains a valid motion system profile command, the appropriate script is opened to execute the desired command. If the contents of the cell contain an invalid command, the profile is paused, and an error window opens. The user is given the opportunity to either kill the profile, fix the command, or ignore the command in that row and proceed with the profile at the next row.

All valid commands have an associated Intouch condition script to execute the command. Typical commands are to select axes, enable/disable selected axes, set movement and unit modes of selected axes, move selected axes in the respective mode, jump to different areas in the profile control Escort operations, pause the profile, display messages to the user, etc.

After the appropriate script is run to execute the desired command, another script, next_line, is executed to read the next row. Once the contents of the next row have been read, the motion system executes the script that determines the desired operation, run_profile, mentioned above. This process of reading the next line, determining the command, and executing the command, continues until either a blank cell in the first column is found, or the command "end" or "End profile" is entered in the first column. At that point, if Escort still has an open cyclic recording, the motion system ends the cyclic recording. The motion system then resets all the necessary profile parameters and ends the profile.

Profile Commands

The profile command scripts may be broken down to several main groups. The first group is used to select various axes. The second group is used to enable or disable the selected axes, or set the motion mode or the units mode for the selected axes. The third group is used to actually move the selected axes. The fourth group is used to jump to different rows inside the profile. The fifth group is a group of commands that control Escort parameters. Finally, the sixth group consists of all other commands available to the user.

Group 1: Select Axes

This group contains just one command, the Select command. The select command also uses the data in columns B through S. The command works in a way that axis names, specified in columns B through S, are selected by the motion system when the select command is issued. If the word "all" is entered in column B, then all axes that have been named are selected. Only the specified axes are selected, i.e., if axis 1 was previously selected, and only axis 2 is specified in the select command, only axis 2 will be selected.

All subsequent axis motion and axis mode commands take place only on the selected axes. Furthermore, for the motion commands, the data entered in columns B through S corresponds to the axes specified in the last select command issued. For example, if a select command selected axis 2 in column M, then all move commands entered after that would have to specify the positioning data for axis 2 in column M. The axes specified in a select command can be entered in any order, and any column may be left blank. The column match between axis name specified in the select command and axis positioning move data exists until another select command is entered. If an incorrect axis name is entered in a select command, an error is generated, and the profile is paused. A profile error window (not shown) is opened which allows the user to either pause the profile and fix the problem, kill the profile, or ignore the error and continue the profile.

Group 2: Enable/Disable, Set Axis Motion or Unit Modes

This group of commands is used to set the motion parameters for the selected axes. The commands do not affect unselected axes.

enable/disable: The Enable command enables the selected axes by turning on the drive enable output to the motor drive 24. The axes are simply placed in enable mode, so any motion (other than homing) requires a further motion mode command. If a fault occurs for whatever reason, the drive will be disabled, but the profile will continue as normal. The axis fault may affect subsequent profile commands. The Disable command disables the selected axes by turning off the drive enable bit.

increment positive increment negative: The increment positive command incrp sets axis motion mode for the selected axes to increment positive, without initiating any axis movement. The increment negative command incrn sets axis motion mode for the selected axes to increment negative, without initiating any axis movement. The positioning parameters are not included in the row that the increment positive mode command or the increment negative command is entered in.

position: The posn command sets axis motion mode for the selected axes to absolute positioning mode, without initiating any axis movement. The positioning parameters are not included in the row that the position mode command is entered in.

null mode: The null command sets axis motion mode for the selected axes to nulling mode. The null mode command does initiate axis movement, since the axes being the nulling process as soon as they are placed in null mode.

engineering units/base units: The eu command sets the selected axes in engineering units, without affecting axis mode. The bu command sets the selected axes to base units, without affecting axis mode.

The motion commands must contain positioning data in the correct format, since the move commands interpret the positioning data in the axis mode at the time the axis move command is issued. For example, if axis 2 is selected when the eu command is issued, axis 2 will be put in engineering units regardless of the previous mode. All subsequent move commands for axis 2 will be interpreted as in engineering units format, until the format is changed.

Group 3: Axis Move Commands

This group of commands is used to actually move the selected axes. Several move commands are available, but they are dependent upon the current mode of the axes.

go: The go command (bufton 164) sends the selected axes to a position based on the axis mode and the data entered for the specified axes. The data in columns B through S is matched with the axis names defined by the previous command position. For example, if axis 5 was selected in column J of the Excel spreadsheet by the previous select command, and if axis 5 was put in absolute positioning mode, then the go command would send axis 5 to the absolute position specified by the contents of column J. The data in column J would be interpreted as either engineering units or base units, depending on the mode of axis 5 when the go command was issued. The go command works in a similar manner for incremental positioning moves.

If the profile had already initiated an Escort recording, the go command would also store a data recording once the in-position bit was set. If, for some reason, the in-position bit cannot be set by the motion system, the user is able to force the in-position bit by clicking a "Force In-Posn" button 170 (FIG. 6). The system will then proceed to take a data recording as normal.

home: The Home Axis button 122 sends the selected axes to their home positions. This command simply attempts to home the axes, and if a fault occurs, the axis is automatically re-enabled and the homing operation is attempted again. No data recording is taken by this command. The system waits for the in-position bit to be set before proceeding with the next step in the profile.

Group 4: Profile Jump Commands

This group of commands is used for control of the order of execution of profile commands. Several commands are available to aid in debugging and looping inside profiles.

jump to row N: Makes the motion system start executing the profile command at the row (N) specified in column B. Thus, the profile can jump to a predetermined row, which can be before or after the current row. The selected axes and axis modes are unaffected by this command.

jump next N rows: Makes the motion system jump the number of rows specified in column B, and start executing the profile at that row. This is always a jump forward command, and is used to skip the next N rows. Again, the selected axes and axis modes are unaffected by this command.

label and jump label: Labels are simply statements that identify possible points at which subsequent jump label commands can jump to. Labels must always be identified in a row previous to the jump label command. Thus, this command is always a jump backwards operation. Up to ten labels may be identified in a profile. The actual label is identified in column B in both the label and jump label commands.

Group 5: DAS Control Commands

This group of commands is used to control the operation of the Escort 32 from the motion system. Escort is a data acquisition system used in a preferred embodiment of the invention. The invention allows for other DAS to be used with minor reprogramming. The motion system must be connected to the Escort system for these commands to function properly. If the Escort system is not connected, the Escort on/off button 150 can be set to off. This mode allows the profiles to proceed without attempting to interface with Escort. The Escort commands are simply replaced with time delay loops in the PLC 20 when Escort is off. This allows profiles to be executed, unchanged, while the Escort system is off or disconnected.

cyclic: Starts an Escort cyclic data recording. It does not start storing data points. If Escort on/off is set to on, the system will wait for an acknowledgment that the cyclic recording was actually started. If the motion system does not have the acknowledgment after 4 seconds, the motion system generates an error. The user then has the option of killing the profile, keeping the profile paused until the system can be fixed, or proceeding with the profile without the cyclic recording.

record: Generates an Escort single reading. Of course, the user must not mix single readings inside cyclic recordings. Again, if the acknowledgment is not sent back to the motion system within 4 seconds, an error is generated, and the user has the option of killing the profile, pausing the profile while the problem is fixed, or continuing on with the profile without the single reading.

end cyclic: Completes the cyclic recording. If an end cyclic command is issued without the motion system taking a cyclic recording at the time, an error is generated. Again, if the motion system does not have the acknowledgment after 4 seconds, the motion system generates an error. The user then has the option of killing the profile, keeping the profile paused until the system can be fixed, or proceeding with the profile without the cyclic recording.

store: Used to take a cyclic reading when in cyclic recording. If a store cyclic command is issued without the motion system taking a cyclic recording at the time, an error is generated. Again, if the motion system does not have the acknowledgment after 4 seconds, the motion system generates an error. The user then has the option of killing the profile, keeping the profile paused until the system can be fixed, or proceeding with the profile without the cyclic recording.

ESP cal: Commands Escort to calibrate the ESP system. If a store cyclic command is issued without the motion system taking a cyclic recording at the time, an error is generated. Again, if the motion system does not have the acknowledgment after 4 seconds, the motion system generates an error. The user then has the option of killing the profile, keeping the profile paused until the system can be fixed, or proceeding with the profile without the ESP calibration.

Group 6: Other commands

A series of other commands is also available to the user. Various commands have been defined to make the user's profiles easier to program, and to give the system more flexibility.

message: Prompts the user for input or gives the user information regarding the operation of the profile. The command opens a message window (not shown), and displays the message. In the profile, the message is written in columns B and C of the Excel spreadsheet in the row containing the message command. The user can either leave the message window open or close it. If the window is closed when any message command is issued, it opens the message window; otherwise, the message command simply changes the message being displayed.

pause: A Pause Profile button 172 (FIG. 6) is operative to pause the profile for an indefinite time. The only way to continue profile execution is to click a Continue Profile button 174 in the profile parameters window 52 (FIG. 6). This command is useful for allowing the user to verify that all axes are in the proper units mode, positioning mode, etc., prior to taking research data or proceeding with the profile. If an axis is not in the correct mode, the user can manually alter the axis mode before continuing on with the profile.

no-op: This command is simply a delay in the profile execution. It does nothing to affect axis selection, mode, or movement. It is simply a 5 second delay loop.

Profile Parameter Window

The profile parameter window 52 allows the user to intervene in the execution of a profile, as well as view the profile parameters and the profile's execution. The window consists of three main areas, each serving a unique purpose.

At the top, the state of the "condition scripts" (FIG. 6) used in the motion system is displayed. If a particular script is executing, its name is shown in red; if not, its name is shown in blue. This allows the user to view the progression of the profile. The names of the scripts are grouped so that related names of related scripts are in the same area.

The middle of the window consists of eight buttons. Their functions and operation are explained below.

Pause Profile: The pause profile button 172 halts the profiles execution until the "Continue Profile" button 174 is clicked.

The pause command in a motion profile will also cause execution of the profile to be paused.

Continue Profile: The Continue Profile button 174 continues execution of a paused profile.

Kill Profile: A Kill Profile button 176 discontinues execution of the current motion profile altogether.

Show Excel Params: Operation of a Show Excel Params button 180 opens a window (not shown) that displays the contents of columns B through S of the current row, and these items will update as the profile is being executed from row to row.

Force In-Posn: The Force In Position button 170 is operative to force the motion system in-position bit, which is useful if an axis is at a point where it cannot set its own in-position bit, such as trying to find the axis null point in an area of turbulence.

Hide Window: A Hide Window button 182 is operative to hide the profile parameters window 52. The window 52 can be displayed again by clicking on the Show Params button 146 on the axis control panel 46.

Escort On/Off: An Escort on button 184 (FIG. 6) toggles Escort communications on or off, and is used identically to the Escort on button 150 (FIG. 6) described hereinabove.

Spare: A Spare button 186 is operative to activate any user defined functions.

The items on the bottom of the window 52 are used to display the status of the parameters used for the Escort handshaking, and the general profile status parameters. The profile parameters are the current row number, current command, and whether the profile has been paused or killed. If a particular parameter is active (on), the name for that parameter is shown in red; otherwise the parameter is shown in blue. The handshaking parameters are set by either Intouch or the PLC 20, and are reset by the Intouch scripts. These parameters work together to ensure that the profile does not advance to the next row before the current row has completed execution, and also work to insure that the Escort system has recorded all necessary data before advancing.

There is thus provided a programmable motion system which is reliable and user-friendly. The features included in the entire system, from the user interface in the software, to the actuator hardware itself, have proven to be quite useful. The speed of taking data has been measurably increased, and is independent of the addition of more axes. Since the motion system is based on software and hardware that is familiar to engineers generally, the ability to program additional features proves to be quite useful, as well.

The installation of the hardware has also proven to be much easier when compared to hardware used in the past. The amount of time required to install or remove hardware has been cut in at least half.

It is to be understood that the present invention is by no means limited to the particular assembly herein disclosed and/or shown in the drawings, but also comprises any modification or equivalent within the scope of the claims.

We claim:

1. An assembly for moving a robotic device along selected axes, said assembly comprising:
    a programmable logic controller (PLC) for controlling movement of the device along selected axes to effect movement of the device to a selected disposition;
    a human-machine interface (HMI) for operator selection of configurations of device movements and in communication with said a central processing unit (CPU); and
    a motor drive system in communication with each of said motion control modules and operable to effect movement of said device along the selected axes to obtain the selected disposition of said device;
    wherein said PLC comprises plurality of single axis motion control modules; and a central processing unit a central processing unit (CPU) in communication with said motion control modules; said PLC being adapted to execute a predefined motion profile using pre-programmed motion commands upon receipt of a command source from said HMI; and being adapted for re-programming of motion profiles in situ during operation of the assembly by an operator of said HMI; and to execute immediately the re-programmed motion profiles, and wherein said device is in communication with a plurality of actuators, each of said actuators being adapted to move and said device along at least one of said selected axes in response to actuation of a motor drive of said motor drive system;
    and wherein said device comprises a probe and said actuators are mounted on a fluid flow conduit, said actuators being adapted each to move its respective probe along said one of said axes, to position said probe for fluid flow parameter monitoring at a selected point in the conduit.

2. The assembly in accordance with claim 1 wherein said probe is a nulling probe.

3. The assembly in accordance with claim 2 wherein said nulling probe is adapted to follow a signal from pressure differential measuring means external to the HMI, the measuring means comprising a proportional/integral/derivative (PID) control loop operating around a positioning loop for an axis of the nulling probe, the PID being adapted to accept pressure signals from a pressure transducer and to calculate a desired position for the nulling probe, which the PID conveys to the PLC for immediate repositioning of the nulling probe, such repositioning not exceeding limits entered in the HMI by the operator.

4. An assembly for moving a rigid probe in a fluid flow conduit along selected axes, said assembly comprising:
    a programmable logic controller (PLC) for controlling movement of the rigid probe along the selected axes, including rotatively around a central axis, to effect movement of the probe to a selected disposition, said PLC comprising:
    a plurality of single axis motion control modules; and
    a central processing unit (CPU) in communication with said motion control modules;
    a human-machine interface (HMI) for operator selection of configurations of probe movements and in communication with CPU; and
    a motor drive system in communication with each of said motion control modules and operable to effect movement of said probe along the selected axes to obtain the selected disposition of said device in the fluid flow conduit; wherein said probe is in communication with a plurality of actuators, each of said actuators being adapted to move said probe along one of said selected axes in response to actuation of said motor drive system; and wherein said rigid probe and said actuators are mounted on the fluid flow conduit, said actuators being adapted each to move said rigid probe along said one of said axes, to position said probe for fluid flow parameter monitoring at a selected point in the conduit.

5. The assembly in accordance with claim 4 herein said probe comprises a fluid flow measuring probe.

6. The assembly in accordance with claim 5 wherein said fluid flow measuring probe is a nulling probe.

7. The assembly in accordance with claim 6 wherein said nulling probe is adapted to follow a signal from pressure differential measuring means external to the HMI, the measuring means comprising a proportional/integral/derivative (PID) control loop operating around a positioning loop for an axis of the nulling probe, the PID being adapted to accept pressure signals from a pressure transducer and to calculate a desired position for the nulling probe, which the PID conveys to the PLC for immediate repositioning of the nulling probe, such repositioning not exceeding limits entered in the HMI by the operator.

* * * * *